United States Patent
D'Anna

(10) Patent No.: US 8,979,495 B2
(45) Date of Patent: Mar. 17, 2015

(54) CONTROL SYSTEM AND METHOD FOR ROTOR ASSEMBLY

(75) Inventor: Frank P. D'Anna, Seymour, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 1135 days.

(21) Appl. No.: 12/959,439

(22) Filed: Dec. 3, 2010

(65) Prior Publication Data

US 2011/0150646 A1  Jun. 23, 2011

Related U.S. Application Data

(60) Provisional application No. 61/288,578, filed on Dec. 21, 2009.

(51) Int. Cl.
| | | |
|---|---|---|
| B64C 27/605 | (2006.01) | |
| B64C 11/30 | (2006.01) | |
| B64C 11/48 | (2006.01) | |
| B64C 27/10 | (2006.01) | |
| B64C 27/80 | (2006.01) | |

(52) U.S. Cl.
CPC ............... *B64C 27/605* (2013.01); *B64C 27/10* (2013.01); *B64C 27/80* (2013.01)
USPC ........................................ 416/114; 244/17.25

(58) Field of Classification Search
CPC ...... B64C 27/605; B64C 11/16; B64C 11/30; B64C 11/303; B64C 11/32; B64C 11/36; B64C 11/46; B64C 11/48; B64C 2027/7255; F03D 3/06; F03D 3/067; F03D 3/068
USPC ............ 416/113, 114, 115; 244/17.11, 17.27, 244/17.25, 17.23
See application file for complete search history.

(56) References Cited

U.S. PATENT DOCUMENTS

| | | | | |
|---|---|---|---|---|
| 1,921,805 | A | * | 8/1933 | Bordoni .................... 416/115 |
| 2,689,616 | A | * | 9/1954 | Nagler ...................... 416/114 |
| 3,308,888 | A | * | 3/1967 | Arcidiacono .............. 416/114 |
| 4,047,838 | A | * | 9/1977 | Ferris et al. ............... 416/115 |
| 4,367,063 | A | | 1/1983 | Herruzo |
| 4,531,692 | A | * | 7/1985 | Mateus .................. 244/17.19 |
| 4,573,873 | A | * | 3/1986 | Yao et al. .................. 416/114 |
| 4,730,795 | A | * | 3/1988 | David .......................... 244/6 |
| 5,165,854 | A | | 11/1992 | Cicare |
| 5,351,913 | A | * | 10/1994 | Cycon et al. ................ 244/60 |
| 5,826,822 | A | | 10/1998 | Rehm |
| 6,099,254 | A | * | 8/2000 | Blaas et al. ................ 416/114 |
| 6,908,286 | B2 | | 6/2005 | Leskow et al. |
| 7,118,340 | B2 | | 10/2006 | D'Anna |
| 7,210,651 | B2 | | 5/2007 | Scott |
| 7,585,153 | B1 | | 9/2009 | Schmaling et al. |
| 7,648,338 | B1 | | 1/2010 | Welsh |
| 2006/0102777 | A1 | | 5/2006 | Rock |
| 2007/0128037 | A1 | * | 6/2007 | Schmaling et al. ....... 416/134 A |
| 2008/0253891 | A1 | * | 10/2008 | Cabrera et al. ........... 416/134 A |

* cited by examiner

*Primary Examiner* — Dwayne J White
*Assistant Examiner* — Joshua R Beebe
(74) *Attorney, Agent, or Firm* — Cantor Colburn LLP

(57) ABSTRACT

A rotor assembly includes a rotor shaft rotatable about a rotor axis and a plurality of rotor blades operably connected to the rotor shaft. A rotor control assembly has a plurality of substantially concentric control tubes extending through the rotor shaft. Each control tube of the plurality of control tubes is operably connected to a rotor blade of the plurality of rotor blades such that movement of one or more of the control tubes of the plurality of control tubes along the rotor axis effects a pitch change in one or more rotor blades of the plurality of rotor blades. A method of controlling pitch of a plurality of rotor blades of a rotor assembly includes locating a plurality of concentric control tubes inside of a rotor shaft of the rotor assembly capable of changing a pitch of one or more of the rotor blades.

9 Claims, 4 Drawing Sheets

CONTROL SYSTEM AND METHOD FOR ROTOR ASSEMBLY

CROSS-REFERENCE TO RELATED APPLICATIONS

This is a nonprovisional application of U.S. Provisional Application No. 61/288,578, filed on Dec. 21, 2009, the disclosure of which is also incorporated herein by reference.

BACKGROUND OF THE INVENTION

The subject matter disclosed herein relates to the art of rotary wing aircraft and, more specifically, to a rotor control system for a rotary wing aircraft.

Control of rotary-wing aircraft is affected by rotor blade pitch variations. The rotor blades are controlled individually (cyclic control) and collectively (collective control). Main rotor pitch control is typically achieved through a swashplate assembly that transfers motion of non-rotating control members to rotating control members. The swashplate assembly is typically concentrically mounted about a rotor shaft. A typical swashplate assembly includes two rings connected by a series of bearings. One ring is mounted to the aircraft (stationary) and another ring is mounted to a hub portion of the rotor shaft (rotating). Movements in the stationary ring are transferred to the rotating ring to control blade pitch.

Rotary-wing aircraft having dual or counter-rotating rotor blade systems require both an upper rotor control system and a lower rotor control system. The lower rotor control system utilizes a conventional swashplate assembly mounted about a lower control rotor shaft. The upper rotor control system is typically more complex and utilizes an upper rotor control shaft mounted through the lower rotor shaft. The upper rotor control system includes an upper rotor swashplate assembly, a motion multiplier, and long control rods located inside the upper rotor control shaft. The long control rods are prone to buckling and thus must be sized accordingly adding weight to the control system. Sizing of the control rods to fit in the upper rotor control shaft can be difficult, however, since it is also advantageous to reduce the diameter to the upper rotor control shaft to reduce system weight.

BRIEF DESCRIPTION OF THE INVENTION

According to one aspect of the invention, a rotor assembly includes a rotor shaft rotatable about a rotor axis and a plurality of rotor blades operably connected to the rotor shaft. A rotor control assembly includes a plurality of substantially concentric control tubes extending through the rotor shaft. Each control tube of the plurality of control tubes is operably connected to a rotor blade of the plurality of rotor blades such that movement of one or more of the control tubes of the plurality of control tubes along the rotor axis effects a pitch change in one or more rotor blades of the plurality of rotor blades.

According to another aspect of the invention, a method of controlling pitch of a plurality of rotor blades of a rotor assembly includes locating a plurality of concentric control tubes inside of a rotor shaft of the rotor assembly. The plurality of control tubes are in operable communication with the plurality of rotor blades. One or more of the control tubes of the plurality of control tubes is translated along a rotor axis of the rotor assembly. One or more of the rotor blades of the plurality of rotor blades is rotated about a pitch change axis via the translation of one or more control tubes of the plurality of control tubes.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
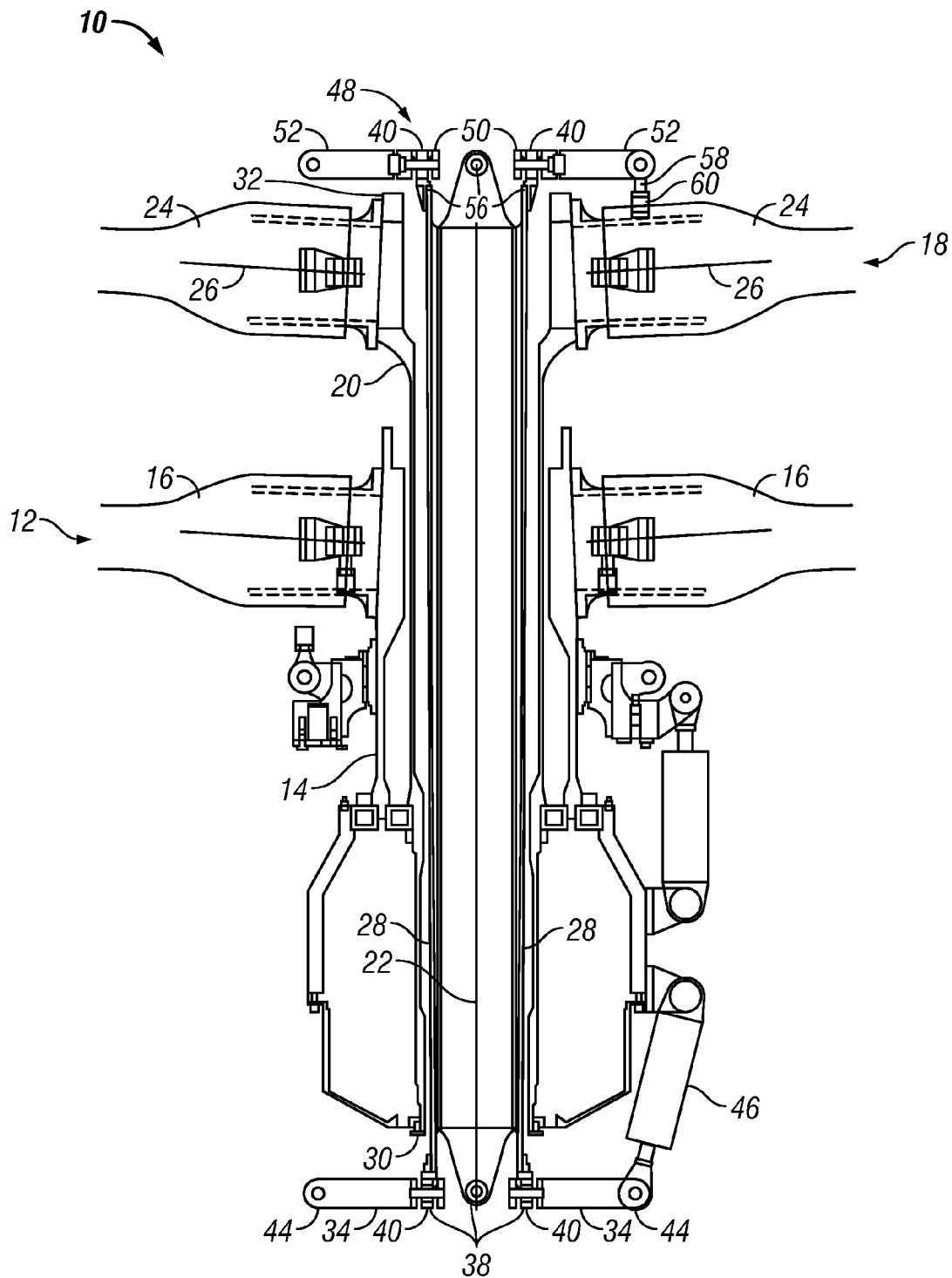
FIG. 1 is a cross-sectional view of an embodiment of a rotor assembly.

Shown in FIG. 1 is a cross-sectional view of an embodiment of a rotor system 10 for a helicopter. The rotor system 10 is a dual-rotor system including a lower rotor assembly 12 which is driven by a lower rotor shaft 14 connected to a plurality of lower rotor blades 16, and an upper rotor assembly 18 which is driven by an upper rotor shaft 20. As shown, the lower rotor shaft 14 is hollow and allows for the upper rotor shaft 20 to extend through an interior of the lower rotor shaft 14 along a rotor axis 22.

Figure 2:
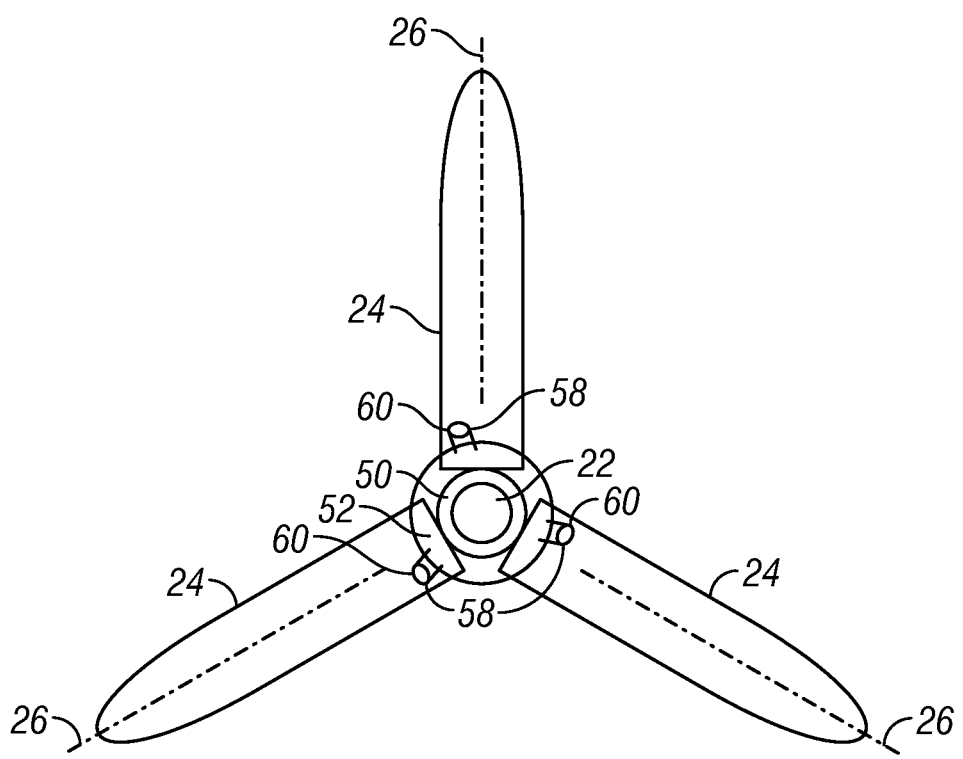
FIG. 2 is a plan view of an embodiment of a rotor assembly.

The upper rotor assembly 18 includes a plurality of upper rotor blades 24 connected to the upper rotor shaft 20. As shown in FIG. 2, in some embodiments, the upper rotor assembly 18 includes three upper rotor blades 24 equispaced about the rotor axis 22. It is to be appreciated, however, that other quantities of upper rotor blades 24, for example, two, four or five upper rotor blades 24 are contemplated within the present scope. Referring again to FIG. 1, each upper rotor blade 24 has a pitch change axis 26 and is rotatably connected to the upper rotor shaft 20 to allow at least rotation of each upper rotor blade 24 about its pitch change axis 26. A plurality of control tubes 28 are concentrically arranged inside the upper rotor shaft 20 and extend from a lower end 30 of the upper rotor shaft 20 to an upper end 32 of the upper rotor shaft 20. In some embodiments, the number of control tubes 28 is always three regardless of the number of upper rotor blades 24 since three points define a control plane. Additional control tubes 28 are therefore not necessary to achieve control of the position of the upper rotor blades 24. For example, in the embodiment of FIG. 1, three concentric control tubes 28 are shown corresponding with the three upper rotor blades 24 of this embodiment.

Figure 3:
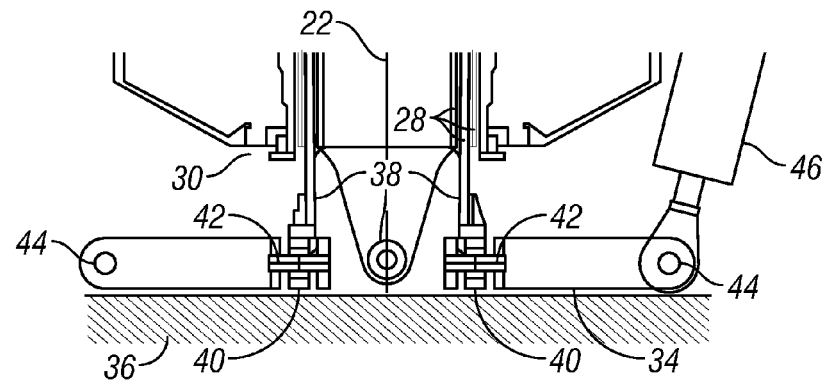
FIG. 3 is a partial cross-sectional view of an embodiment of a rotor assembly.

Referring to FIG. 3, at the lower end 30, each control tube 28 is attached to a non-rotating star plate 34 which extends circumferentially around the rotor axis 22 and if fixed relative to a helicopter airframe 36. As shown, each control tube 28 includes a lower attachment tab 38 including a self-aligning bearing 40 which has both axial and spherical elements. A bolt 42 or other attachment means extends from the star plate 34 through the lower attachment tab 38 to secure the control tube 28 to the star plate 34. The star plate 34 includes a plurality of servo attachments 44, a control servo 46 operably connected at each servo attachment 44. The number of servo attachments 44 and control servos 46 corresponds with the number of control tubes 28, but the circumferential position of each control servo 46 is not required to be the same as the circumferential position of each attachment tab 38. Each control servo 46 is positioned and configured such that activation of the collection of control servos 46 results in axial motion of the collection of control tubes 28 along the rotor axis 22.

Figure 4:
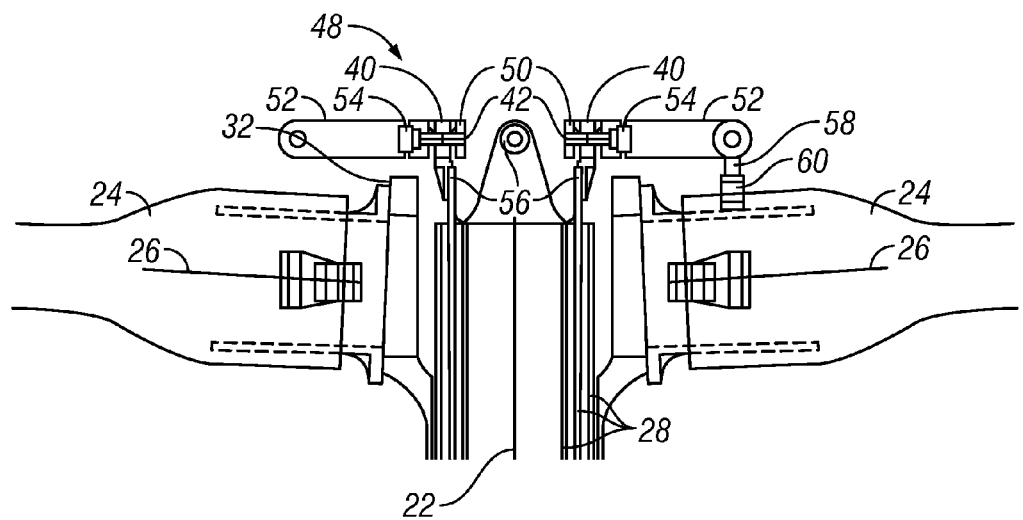
FIG. 4 is another partial cross-sectional view of an embodiment of a rotor assembly.

Referring to FIG. 4, at the upper end 32, each control tube is attached to a swash plate assembly 48. The swash plate assembly 48 includes a non-rotating inner swash plate ring 50 and a rotatable outer swash plate ring 52. The inner swash plate ring 50 and outer swash plate ring 52 are connected via a plurality of swash plate bearings 54. The upper end 32 of each control tube 28 includes an upper attachment tab 56 including a self-aligning bearing 40 which has both axial and spherical elements. As with the star plate 34, a bolt 42 or other attachment means extends from the inner swash plate ring 50 through the upper attachment tab 56 to secure the control tube 28 to the inner swash plate ring 50. The outer swash plate ring 52 is connected to each upper rotor blade 24 via an upper control arm 58. The number of upper control arms 58 corresponds with the number of upper rotor blades 24. Referring again to FIG. 2, a connection point 60 of the upper control arm 58 to its corresponding upper rotor blade 24 is offset from the blade pitch axis 26 such that movement of the upper control arm 58 along the rotor axis 22 results in rotation of the upper rotor blade 24 about the blade pitch axis 26 thus changing a pitch of the upper rotor blade 24.

Referring again to FIG. 1, the plurality of concentric control tubes 28 may be utilized to change the pitch of the upper rotor blades 24 both collectively and cyclically. To collectively change the pitch, the control servos 46 receive inputs from the pilot or other source and effect movement of the star plate 34 evenly around its circumference. This results in movement of each control tube 28 along the rotor axis 22 in the same direction and to the same magnitude. Since the control tubes 28 each move to the same degree, the inner swash plate ring 50 is also translated evenly along the rotor axis 22. This results in an outer swash plate ring 52 path about the inner swash plate ring 50 which is substantially planar and perpendicular to the rotor axis 22 so that the pitch of the upper rotor blades 24 is constant throughout their rotation about the rotor axis 24.

In some conditions, it is advantageous to change the pitch of the rotor blades cyclically. To achieve cyclic pitch control, the servos are activated unevenly, so the star plate does not move evenly, relative to the rotor axis 24, around its circumference. This results in unequal movement of the control tubes 28 along the rotor axis 22, and thereby an outer swash plate ring 52 path which is not entirely perpendicular to the rotor axis 22. Thus, the pitch of each upper rotor blade 24 will cyclically change as the upper rotor blade 24 rotates about the rotor axis 22.

Figure 5:
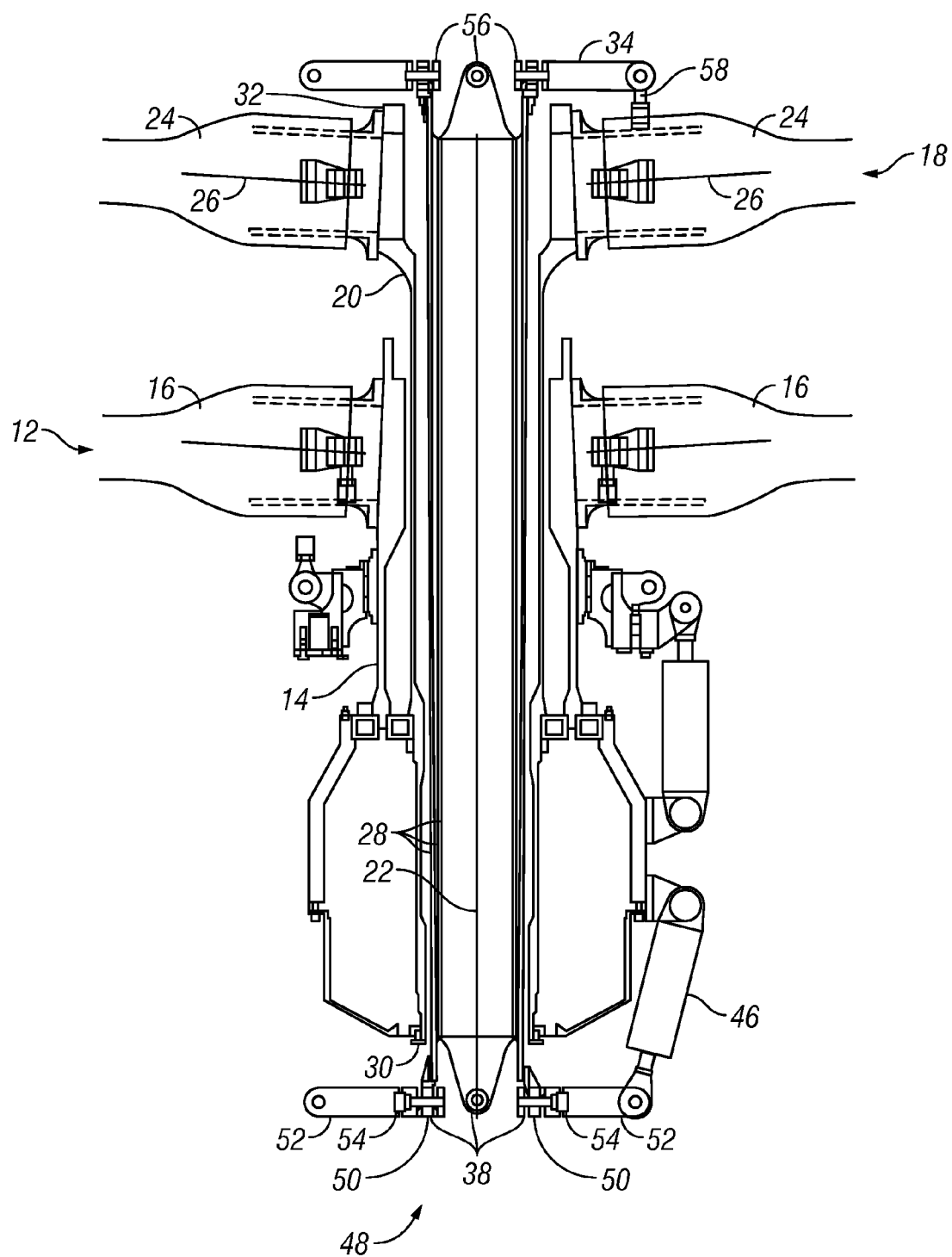
FIG. 5 is a cross-sectional view of another embodiment of a rotor assembly.

In some embodiments, as shown in FIG. 5, the positions of the star plate 34 and the swash plate assembly 48 are reversed, so that the star plate 34 is located at the upper end 32 and the swash plate assembly is located at the lower end 30. In this embodiment, the outer swash plate ring 52 is rotationally fixed and the inner swash plate ring 50 is rotatable. As in the other embodiments, the control servos 46 receive inputs. In this case the control servos 46 displace the outer swash plate ring 52 either evenly or unevenly depending on the desired pitch control. This displacement translates through the inner swash plate ring 50 which effects movement of each control tube 28 of the plurality of control tubes 28 along the rotor axis 22. The displacement of the control tubes 28 translates to (even or uneven) displacement of the star plate 34 which in turn effects change in pitch of each upper rotor blade 24 of the plurality of upper rotor blades 24.

Since the concentric control tubes 28 can be sized with larger diameters than the same number of individual prior art control rods fitting in the same space inside an upper rotor shaft 20, the control tubes 28 can be more easily sized to resist buckling loads. Further, sliding bearings or the like may be incorporated between the control tubes 28 to allow the tubes to interact and more greatly resist buckling. Because the control tubes 28 will have greater buckling resistance, the upper rotor shaft 18 may, in some instances, be able to be reduced in diameter, saving weight.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A rotor assembly comprising:
a rotor shaft rotatable about a rotor axis;
a plurality of rotor blades operably connected to the rotor shaft;
a rotor control assembly including a plurality of substantially concentric control tubes extending through the rotor shaft, each control tube of the plurality of control tubes operably connected to a rotor blade of the plurality of rotor blades such that movement of one or more of the control tubes of the plurality of control tubes along the rotor axis effects a pitch change in one or more rotor blades of the plurality of rotor blades;
wherein the plurality of control tubes are substantially concentric about each other;
wherein the plurality of control tubes comprises three control tubes;
wherein the plurality of control tubes are moveable independently to effect cyclic pitch change of the plurality of rotor blades.

2. The rotor assembly of claim 1 wherein the plurality of control tubes are in operable communication with a plurality of control servos.

3. The rotor assembly of claim 2 wherein the plurality of control tubes are operably connected to the plurality of control servos via a star plate disposed at a first end of the plurality of control tubes.

4. The rotor assembly of claim 3 wherein each control tube of the plurality of control tubes includes a self-aligning bearing disposed at an attachment point of each control tube of the plurality of control tubes to the star plate.

5. The rotor assembly of claim 1 wherein the plurality of control tubes are operably connected to the plurality of rotor blades via a swash plate assembly.

6. The rotor assembly of claim 5 wherein a plurality of control arms connect the swash plate assembly to each rotor blade of the plurality of rotor blades.

7. The rotor assembly of claim 6 wherein each control arm is connected to each rotor blade of the plurality of rotor blades at a point offset from a pitch change axis of each rotor blade of the plurality of rotor blades.

8. The rotor assembly of claim 1 wherein the rotor assembly is a dual rotor assembly.

9. A rotor assembly comprising:
   a rotor shaft rotatable about a rotor axis;
   a plurality of rotor blades operably connected to the rotor shaft;
   a rotor control assembly including a plurality of substantially concentric control tubes extending through the rotor shaft, each control tube of the plurality of control tubes operably connected to a rotor blade of the plurality of rotor blades such that movement of one or more of the control tubes of the plurality of control tubes along the rotor axis effects a pitch change in one or more rotor blades of the plurality of rotor blades;
   wherein the plurality of control tubes are substantially concentric about each other;
   wherein the plurality of control tubes comprises three control tubes;
   wherein the plurality of control robes are moveable independently to effect collective pitch change of the plurality of rotor blades.

\* \* \* \* \*